(12) United States Patent  (10) Patent No.: US 8,921,714 B2
Haberek et al.  (45) Date of Patent: Dec. 30, 2014

(54) MODULAR DEVICE HOUSING ASSEMBLY

(75) Inventors: Andrew M. Haberek, Baldwinsville, NY (US); Kapil Ganta, Houston, TX (US); Theodore Junko, Manlius, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 102 days.

(21) Appl. No.: 13/311,179

(22) Filed: Dec. 5, 2011

(65) Prior Publication Data

US 2012/0222896 A1   Sep. 6, 2012

Related U.S. Application Data

(63) Continuation-in-part of application No. 12/349,673, filed on Jan. 7, 2009, now Pat. No. 8,072,779.

(51) Int. Cl.
 *H01R 13/502* (2006.01)
 *H02G 3/14* (2006.01)
 *H02B 1/01* (2006.01)
 *H02G 3/12* (2006.01)

(52) U.S. Cl.
 CPC ..................................... *H02G 3/123* (2013.01)
 USPC ............................. 174/560; 220/241; 361/825

(58) Field of Classification Search
 None
 See application file for complete search history.

(56) References Cited

U.S. PATENT DOCUMENTS

| | | | |
|---|---|---|---|
| 2,012,875 A | 8/1935 | Guett | |
| 3,418,420 A * | 12/1968 | Zerwes | 174/53 |
| 4,221,941 A * | 9/1980 | Genovese | 200/457 |
| 4,613,729 A | 9/1986 | Daisenberger | |
| 4,758,687 A * | 7/1988 | Lathrop | 174/53 |
| 4,972,045 A | 11/1990 | Primeau | |
| 5,012,043 A * | 4/1991 | Seymour | 174/57 |
| 5,114,365 A * | 5/1992 | Thompson et al. | 439/540.1 |
| 5,135,411 A * | 8/1992 | Wiley et al. | 439/535 |
| 5,289,934 A | 3/1994 | Smith et al. | |
| 5,350,884 A * | 9/1994 | Littrell | 174/489 |
| 5,419,716 A * | 5/1995 | Sciammarella et al. | 439/540.1 |
| 5,434,359 A * | 7/1995 | Schnell | 174/58 |
| 5,486,650 A * | 1/1996 | Yetter | 174/53 |
| 5,526,952 A | 6/1996 | Green | |
| 5,599,206 A * | 2/1997 | Slack et al. | 439/536 |
| 5,621,788 A | 4/1997 | Eiken | |
| 5,679,924 A * | 10/1997 | Young et al. | 174/50 |
| 5,683,005 A * | 11/1997 | Mordick | 220/3.7 |
| 5,700,978 A | 12/1997 | Huff | |
| 5,778,625 A * | 7/1998 | Druffel et al. | 52/577 |
| 5,813,130 A * | 9/1998 | MacDowell | 33/528 |
| 5,931,325 A * | 8/1999 | Filipov | 220/3.7 |
| 5,961,345 A * | 10/1999 | Finn et al. | 439/536 |
| 6,172,301 B1 | 1/2001 | Goodsell | |
| 6,207,895 B1 | 3/2001 | Engel | |

(Continued)

*Primary Examiner* — Hoa C Nguyen
*Assistant Examiner* — Xanthia C Cunningham
(74) *Attorney, Agent, or Firm* — Daniel P. Malley; Bond Schoeneck & King, PLLC

(57) ABSTRACT

The present invention is directed to a modular wall box system configured to be mounted substantially flush with respect to the wall. The assembly includes a plurality of wall surfaces, each wall surface includes a single gang opening that accommodates an AC electrical wiring device or a low voltage telecom device. At least one removable flange cover is configured to be removably coupled to the mounting flange. At least one modular connector can be inserted within the single gang modular device opening and includes a slidable engagement portion. The slidable engagement portion slidably engages a lateral edge of the wall surface forming the single gang modular device opening such that the at least one modular connector is slidably moveable to any vertical position.

38 Claims, 12 Drawing Sheets

(56) References Cited

U.S. PATENT DOCUMENTS

| | | |
|---|---|---|
| 6,229,087 B1 | 5/2001 | Archer |
| 6,346,674 B1 * | 2/2002 | Gretz ............................ 174/58 |
| 6,403,883 B1 * | 6/2002 | Morgan et al. ................. 174/58 |
| 6,793,524 B2 * | 9/2004 | Clark et al. .................. 439/536 |
| 6,875,937 B1 | 4/2005 | Saviano |
| 6,949,708 B1 | 9/2005 | Hausen et al. |
| 7,112,743 B2 * | 9/2006 | Hull et al. ...................... 174/58 |
| 7,141,736 B2 * | 11/2006 | Plankell ......................... 174/50 |
| 7,270,436 B2 | 9/2007 | Jasper |
| 7,294,024 B2 * | 11/2007 | Hammond et al. ........... 439/676 |
| 7,468,486 B2 * | 12/2008 | Yan ................................ 174/58 |
| 7,510,429 B1 * | 3/2009 | Savicki et al. ................ 439/535 |
| 7,531,743 B2 * | 5/2009 | Johnson et al. ................. 174/57 |
| 7,544,889 B1 * | 6/2009 | Sanchez ......................... 174/58 |
| 7,618,284 B2 * | 11/2009 | Lamoureux et al. .......... 439/535 |
| 7,622,676 B2 * | 11/2009 | Drane et al. .................... 174/66 |
| 7,757,875 B2 * | 7/2010 | Lalancette et al. ........... 220/4.02 |
| 7,771,230 B2 * | 8/2010 | Hammond et al. ........ 439/541.5 |
| 8,250,773 B1 * | 8/2012 | Shotey et al. ................... 33/528 |
| 2007/0279887 A1 * | 12/2007 | Sullivan et al. ............... 361/809 |
| 2008/0130223 A1 * | 6/2008 | Nakamura et al. ............ 361/689 |
| 2008/0196921 A1 * | 8/2008 | Dinh .............................. 174/58 |
| 2008/0207047 A1 * | 8/2008 | Walton .......................... 439/538 |
| 2010/0000756 A1 * | 1/2010 | Peck ............................... 174/51 |

* cited by examiner

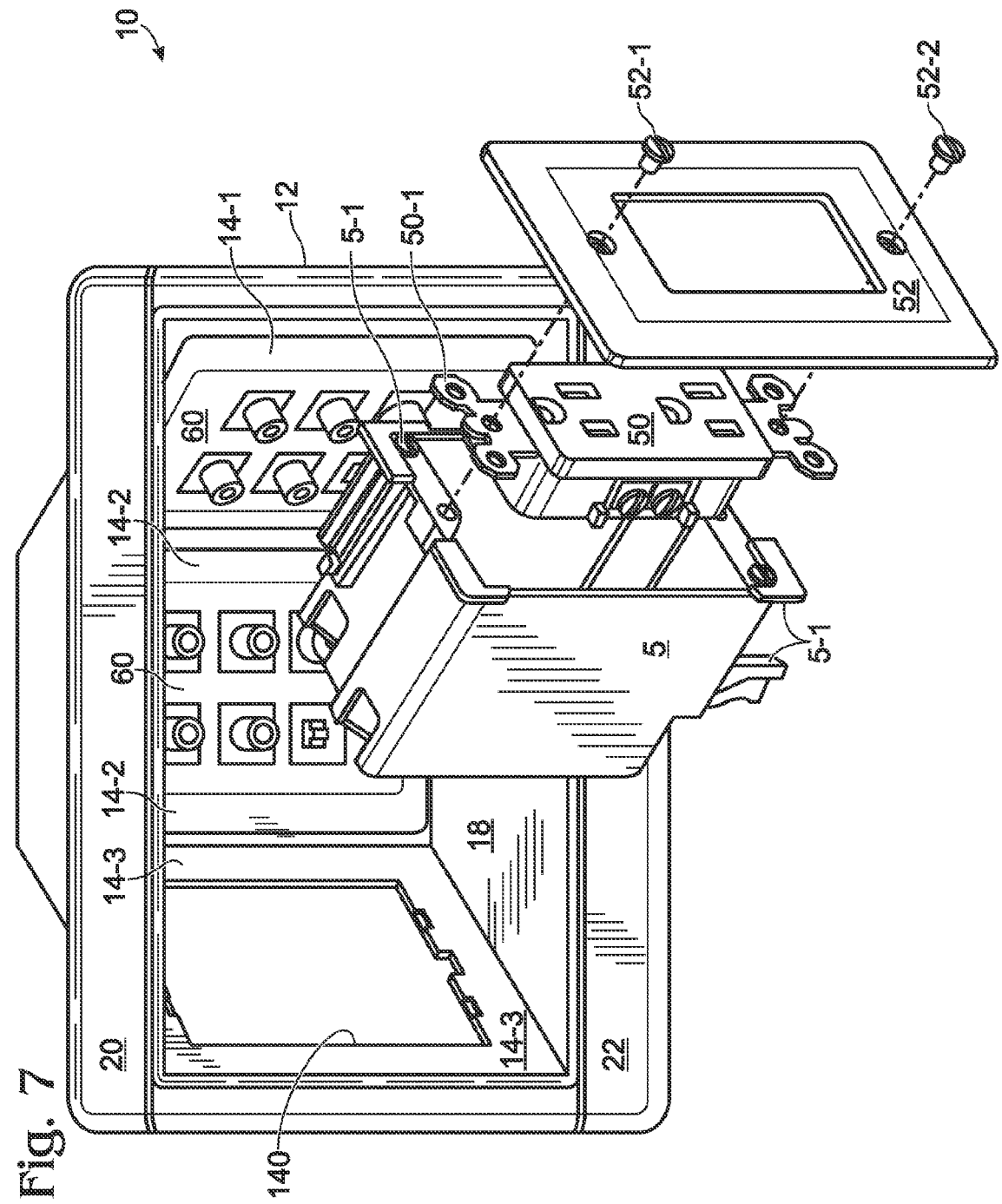

MODULAR DEVICE HOUSING ASSEMBLY

CROSS-REFERENCE TO RELATED APPLICATIONS

This is a continuation of U.S. patent application Ser. No. 12/349,673 filed on Jan. 7, 2009, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical device housing assemblies, and particularly to recessed electrical device housings.

2. Technical Background

With the advent of commercial electronics, consumers have sought to purchase various types of electronic equipment to provide entertainment for themselves and their families. Home entertainment electronics initially included nothing more than a radio receiver or a record player. But by the early 1950's, many homes included a black and white television set. The only electrical connection for radios and televisions was a simple electrical plug that was inserted into an electrical outlet for 120 VAC electrical power. Media content was delivered to the radio or the television by RF signals broadcast over the air. Over time, however, home entertainment systems increased in complexity as new kinds of audio-visual electronics were introduced.

Nowadays, broadcasting RF television signals directly to the TV receiver has become largely passé. Most home entertainment systems typically include a cable-TV or a satellite television receiver. The cable-TV set may receive service from the curb via a coaxial feed or via a fiber optic feed. Both types of units (i.e., cable or satellite) provide low voltage audio-visual signals to the television by way of a cable. The media content can be provided by a number of sources including "game stations," a DVD or "Blu-ray" player, a computer, and/or a "surround-sound" audio system. If the consumer is an audiophile, he or she may have audio preamplifiers, CD players, "IPods®," or other such devices.

Many modern homes are now wired to include low voltage telecommunications wiring to avoid having various kinds of unsightly telephony, coaxial, and/or HDMI wiring visible throughout the home. Thus, a home entertainment system may require multiple AC power outlets and multiple telecommunications outputs to accommodate all of these wires.

As those skilled in the art will appreciate, an electrical wiring device must be enclosed in a device box for safety reasons. An AC electrical duplex receptacle is often designed to fit in a single gang device box. But AC electrical wiring devices come in all sizes and a single gang device box can accommodate multiple devices. For instance, a single gang device box can accommodate a switch and dimmer assembly, and a switch in combination with a single receptacle outlet. On the other hand, multi-gang electrical wiring device boxes may be employed. One example of this is when two or more electrical duplex receptacles are required; two duplex receptacles are often mounted side-by-side in a two-gang device box. If three such devices are employed, a three gang device box may be required, and so on and so forth. Those skilled in the art will also appreciate that low voltage telecommunication wiring devices typically do not require device boxes. Instead, as shown in FIG. 1, an adapter 1 may be employed to mount the low voltage electrical wiring device to the wall. The user typically removes a rectangular portion of dry-wall where telecommunications service is desired. The telecom wires are inserted through the rectangular aperture of the adapter 1 and it is then inserted into the wall opening. The adapter includes a pair of screw-type mounting brackets 2. When adapter 1 is in place, the installer will turn the screw brackets 2 such that the flange 4 captures the drywall there between. At this point, a low voltage telecommunication device is mounted to the adapter 1 by mounting screws that are inserted into the threaded screw holes 3.

Those skilled in the art will further appreciate that there must be a physical barrier between AC power devices and low voltage telecom devices to prevent AC power from being inadvertently propagated on telecom wiring. Such an occurrence is unexpected and would lead to shock or electrocution. Thus, conventional wiring systems include a device box for AC electrical wiring devices and a separate adapter for low voltage telecom wiring. Both the AC electrical device and the telecom device are typically mounted flush with the drywall. This is undesirable because it is both unsightly and potentially dangerous, since an electrical plug extending perpendicularly from the wall may become partially exposed for various reasons.

FIG. 2 is an isometric view of another approach that has been considered. In this view, an old work mounting box 1 includes a first opening 6-1 that is dedicated to an AC electrical wiring device and a second opening 6-2 that is dedicated to telecommunications devices. While this represents an improvement over the device depicted in FIG. 1, there are several drawbacks. First, the box 1 offers no modularity because first opening 6-1 is dedicated to accommodating a device box for an AC electrical wiring device and the second opening 6-2 is dedicated to telecommunications devices (Note that connection tabs 6-3 accommodate the mounting screws for a telecom device). Moreover, the mounting surface 7-2 is not employed. In addition, the 2-gang opening 6-2 is parallel to the frame 1-1 (and hence the drywall). However, this is not an efficient use of space and results in a relatively large non-compact device box.

What is needed is a compact modular housing assembly that is configured to efficiently accommodate either AC electrical devices or telecom devices in a single recessed compartment, or both AC electrical devices and telecom devices in a single recessed compartment while providing the requisite electrical isolation between AC power devices and telecom devices. Moreover, a modular housing assembly is needed that can adaptively accommodate the wide variety of electrical wiring devices and telecom devices described above.

SUMMARY OF THE INVENTION

The present invention addresses the needs described above by providing a compact modular housing assembly that is configured to efficiently accommodate either, or both, AC electrical devices and low voltage telecom devices in a single recessed compartment while providing the requisite electrical isolation between AC power devices and low voltage telecom devices. The present invention also provides a modular housing assembly that includes an adaptive connector that accommodates the wide variety of electrical wiring devices and telecom devices previously described.

One aspect of the present invention is directed to a modular wall box system includes a housing structure that has a rectangular frame portion configured to be mounted substantially flush with respect to the wall upon installation of the system. The rectangular frame portion includes an upper frame member, a lower frame member, a first upright frame member interconnecting the upper frame member to the lower frame member at one end thereof and a second upright frame member interconnecting the upper frame member to the lower frame member at second end thereof. The frame also includes a recessed roof portion connected to the upper frame member and a recessed floor portion connected to the lower frame member such that the recessed roof portion is substantially parallel to the recessed floor portion. A plurality of wall surfaces is connected between the roof portion and the floor portion to form a recessed device mounting volume. Each wall surface of the plurality of wall surfaces includes a single gang modular device opening configured to accommodate either an AC electrical wiring device or a low voltage telecom device. A first wall surface of the plurality of wall surfaces is connected to the first upright frame member and extends away from the upper frame member and the lower frame member at a first acute angle. And a second wall surface of the plurality of wall surfaces is connected to the second upright frame member and also extends away from the upper frame member and the lower frame member at a second acute angle such that each of the plurality of wall surfaces are not coplanar with respect to any other one of the plurality of wall surfaces devices. At least one mounting flange is formed in at least one of the upper frame member, lower frame member, first upright frame member or second upright frame member. The at least one mounting flange includes a plurality of mounting elements configured to mount the housing structure to the wall. At least one removable flange cover is configured to be removably coupled to the at least one mounting flange after the housing structure is mounted to the wall. The at least one removable flange cover is configured to cover the plurality of mounting elements when the at least one removable flange cover is coupled to the at least one mounting flange.

In another aspect, the present invention is directed to a modular wall box system includes a housing structure that has a rectangular frame portion configured to be mounted substantially flush with respect to the wall upon installation of the system. The rectangular frame portion includes an upper frame member, a lower frame member, a first upright frame member interconnecting the upper frame member to the lower frame member at one end thereof and a second upright frame member interconnecting the upper frame member to the lower frame member at second end thereof. The frame also includes a recessed roof portion connected to the upper frame member and a recessed floor portion connected to the lower frame member such that the recessed roof portion is substantially parallel to the recessed floor portion. A plurality of wall surfaces is connected between the roof portion and the floor portion to form a recessed device mounting volume. Each wall surface of the plurality of wall surfaces includes a single gang modular device opening configured to accommodate either an AC electrical wiring device or a low voltage telecom device. A first wall surface of the plurality of wall surfaces is connected to the first upright frame member and extends away from the upper frame member and the lower frame member at a first acute angle. And a second wall surface of the plurality of wall surfaces is connected to the second upright frame member and also extends away from the upper frame member and the lower frame member at a second acute angle such that each of the plurality of wall surfaces are not coplanar with respect to any other one of the plurality of wall surfaces devices. At least one mounting flange is formed in at least one of the upper frame member, lower frame member, first upright frame member or second upright frame member. The at least one mounting flange includes a plurality of mounting elements configured to mount the housing structure to the wall. At least one removable flange cover is configured to be removably coupled to the at least one mounting flange after the housing structure is mounted to the wall. The at least one removable flange cover is configured to cover the plurality of mounting elements when the at least one removable flange cover is coupled to the at least one mounting flange. At least one modular connector is configured to be inserted within the single gang modular device opening. The at least one modular connector includes a slidable engagement portion disposed at either end thereof. The slidable engagement portion is configured to slidably engage a lateral edge of the wall surface forming the single gang modular device opening such that the at least one modular connector is slidably moveable to any vertical position within the single gang modular device opening.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

FIG. 7 is an exploded view showing the installation of a device box and an AC electrical duplex outlet into the modular housing assembly depicted in FIGS. 3A-3B;

DETAILED DESCRIPTION

Figure 1:
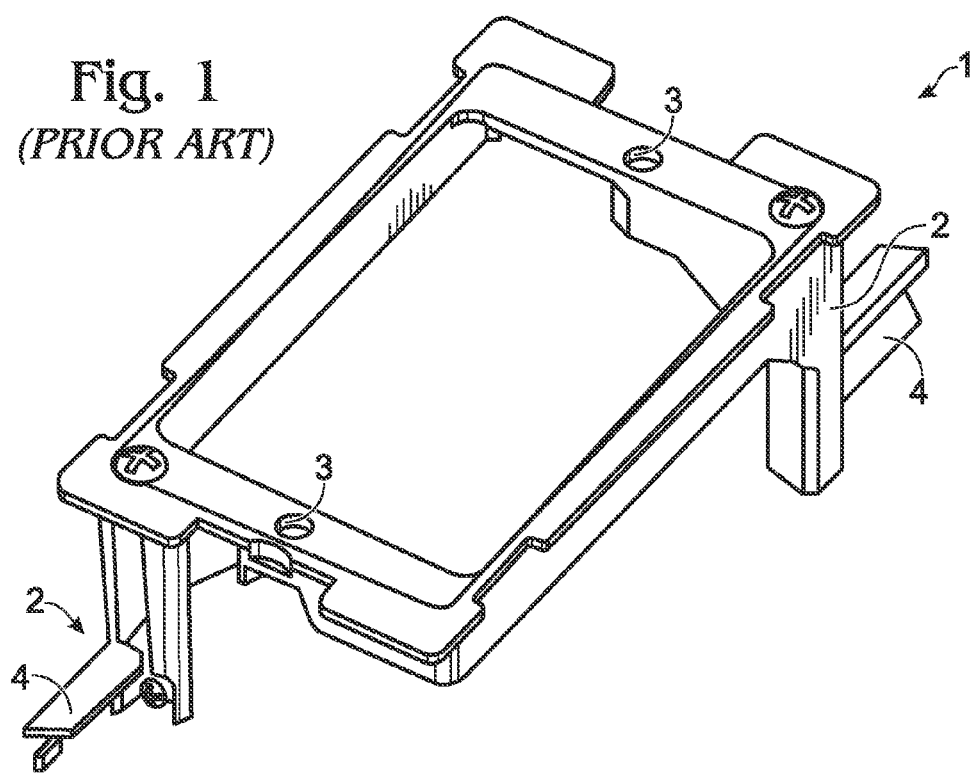
FIG. 1 is an isometric view of a conventional low voltage telecom adapter.
Figure 2:
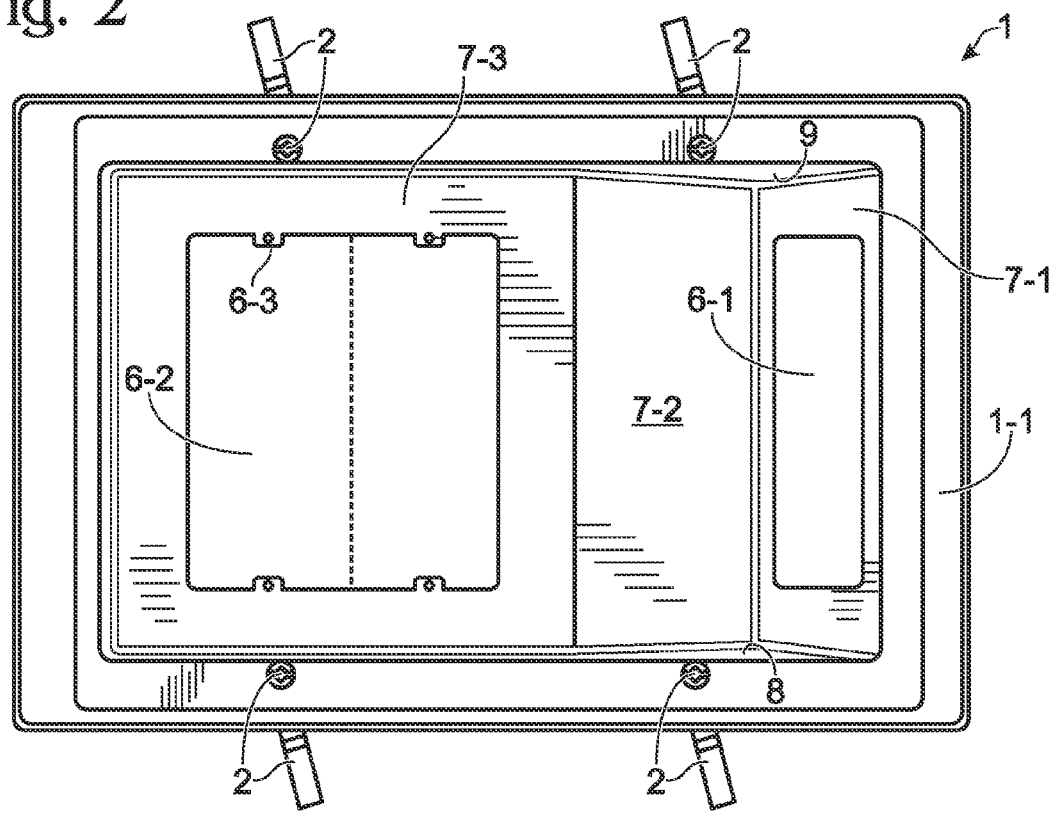
FIG. 2 is an isometric view of a conventional housing assembly.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the modular housing assembly of the present invention is shown in FIG. 3A-3B, and is designated generally throughout by reference numeral 10.

Figure 3A:
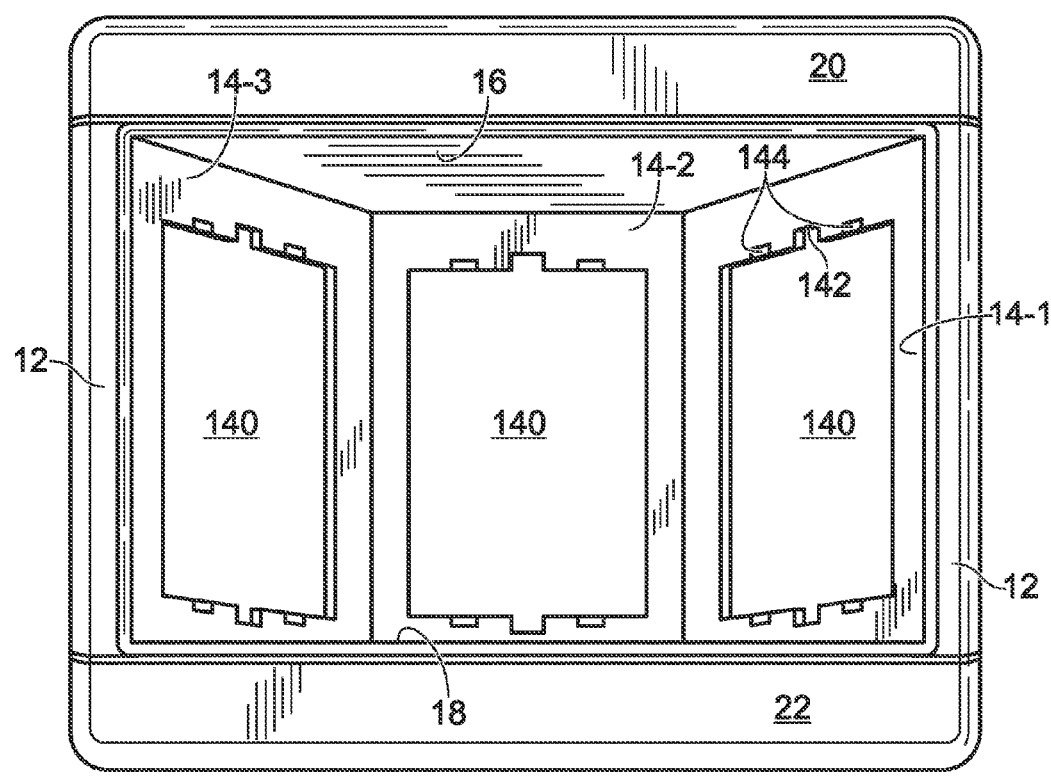
FIGS. 3A-3B are isometric views of the modular housing assembly in accordance with an embodiment of the present invention.
Figure 3B:
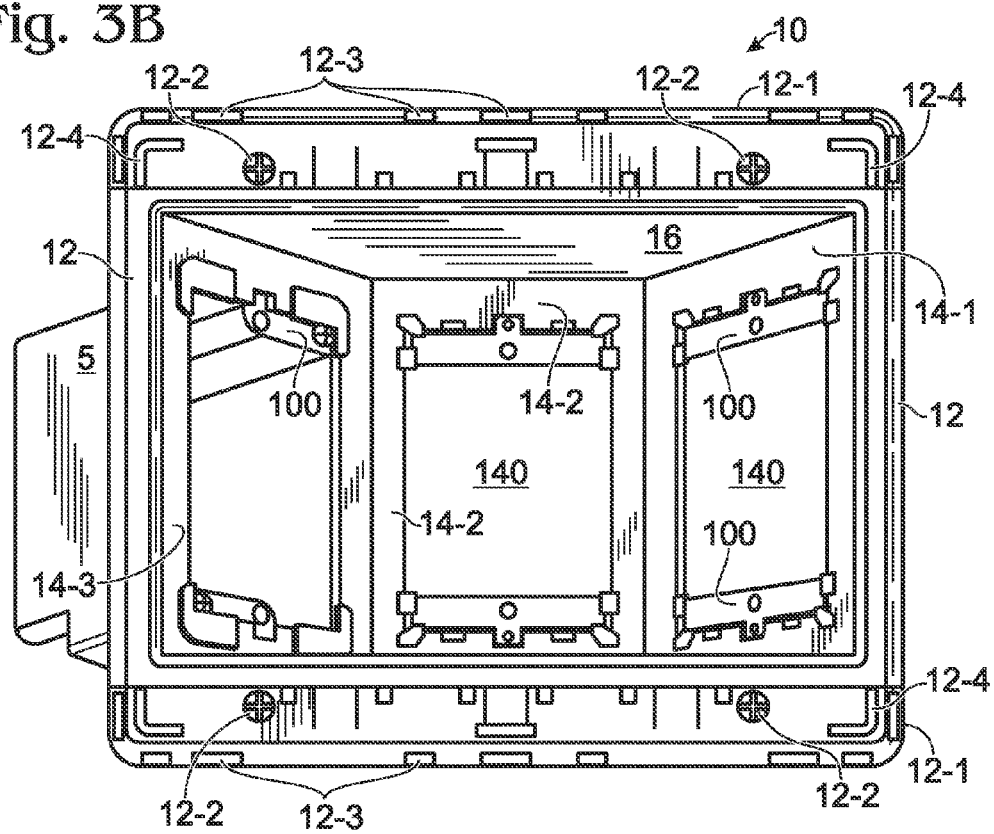

As embodied herein and depicted in FIGS. 3A-3B, isometric views of the modular housing assembly 10 in accordance with one embodiment of the present invention is disclosed. FIG. 3A shows the modular housing assembly without the modular connector 100 attached thereto. The modular housing assembly 10 includes a frame portion 12 that is substantially flush with the drywall when the assembly 10 is installed. The frame 12 includes a top aesthetic flange cover 20 and a bottom aesthetic flange cover 22. The aesthetic flange covers (20, 22) cover the mounting flanges 12-1 (shown in FIG. 3B) such that the mounting screws 12-2 are hidden from view. Thus, the flange covers (20, 22) provide an aesthetically pleasing finish that consumers appreciate. Reference is made to co pending U.S. patent application Ser. No. 11/247,896, filed on Oct. 11, 2005, which is incorporated herein by reference as though fully set forth in its entirety, for a more detailed explanation of designer flange covers 20, 22 in accordance with an alternate embodiment of the present invention.

The modular housing assembly 10 is a three gang assembly that includes a recessed region having three planar device mounting surfaces (14-1, 14-2, and 14-3), a planar roof portion 16, and a planar floor surface 18. Thus, in this embodiment, the assembly 10 is a three-gang assembly that accommodates any combination of AC wiring devices 50 or low voltage telecom devices 60. See, e.g., FIGS. 6-11 for a few non-limiting examples of the permutations possible with the present invention. The roof 16 and the floor 18 are quadrilateral surfaces such that none of the mounting surfaces (14-1, 14-2, and 14-3) are disposed in the same plane. Moreover, the modular housing assembly 10 can be configured as an N-ganged housing assembly, wherein N is greater than or equal to 2. By way of example, the present invention contemplates 3, 4, or 5 gang modular assemblies 10.

The housing assembly 10 is modular in two ways. First, the openings 140 may accept either an AC electrical device 50 or a low voltage telecom device 60. Second, the modular connector 100 may be employed as a means to mount low voltage telecom devices within an opening 140 or it may be used to modularize a single gang opening 140 such that it can accommodate more than one electrical wiring device.

Each type of device is described in greater detail below, but it is sufficient to note at present that the term electrical wiring device is configured to conduct AC electrical power (e.g., 120 VAC, 60 Hz, 15 A). Examples of electrical wiring devices include outlet receptacles (e.g., 120 VAC, 240 VAC, etc.), ON/OFF light or fan speed switches, dimmers, ground fault circuit interrupters (GFCIs), surge protective devices (SPDs), transient voltage suppressors (TVSSs), electrical charging devices, arc fault circuit interrupters (AFCIs), proximity sensors, and combinations thereof. The term telecom device refers to telecom devices 60 that propagate low voltage (or optical) information carrying signals that typically do not have the capability of shocking or electrocuting a consumer. Examples of telecom devices include, but are not limited to, coaxial sockets, telephone sockets, data sockets, RCA ports, HDMI ports, USB ports, S-Video ports, low voltage ports, DC voltage ports, etc., as a person skilled in the art would understand to be low voltage devices.

In reference to FIG. 3B, the modular housing assembly 10 is shown with an AC electrical device box 5 installed in the opening 140 within the planar surface 14-3. The other openings 140 corresponding to planar surfaces 14-1 and 14-2 include the modular telecom connectors 100. In the one embodiment (FIGS. 3A-3B), each device opening 140 may include a center notch 142 to provide clearance for each wall plate screw and side detents 144 that are configured to mate with the modular connectors 100. Moreover, there are no connection tabs that would prevent modular connectors 100 from engaging with assembly 10.

FIG. 3B also shows the assembly 10 with the aesthetic flange covers (20, 22) removed. Thus, the frame 12 includes upper and lower mounting flanges 12-1. Each mounting flange 12-1 accommodates mounting screws 12-2 that actuate the screw brackets 11 (not shown in this view) that attach the assembly 10 to the drywall. Each mounting flange 12-1 also includes attachment slots 12-3 that register and mate with snap-in elements (not shown) associated with the aesthetic cover plates 20, 22. A registration slot 12-3 is also included at each end of the flange 12-1. The registration slot 12-3 mates with a registration snap-in element on the corresponding aesthetic cover plate such that the appropriate snap-in element mates with its corresponding slot 12-3. FIG. 3B also shows marking holes 12-4 disposed at each corner of the frame 12 within the mounting flange 12-1.

Figure 4A:
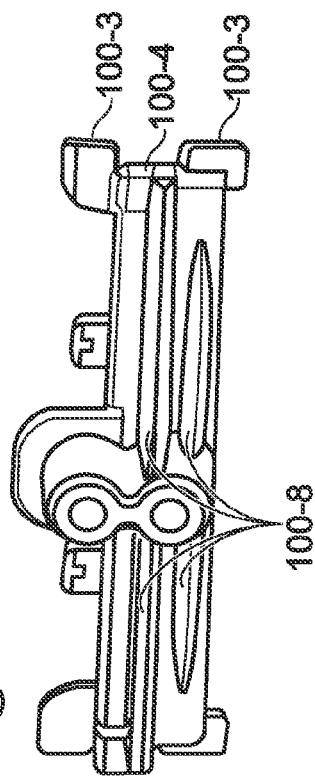
FIGS. 4A-4E include various views of the modular connector depicted in FIGS. 3B.
Figure 4B:
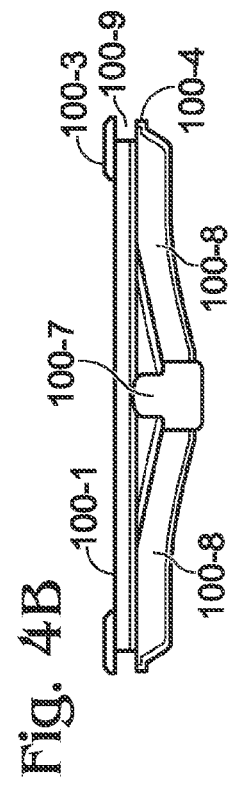

As embodied herein and depicted in FIGS. 4A-4E, various views of the modular connector 100 depicted in FIG. 3B are disclosed. In FIG. 4A, the modular connector 100 is shown to include a body portion 100-1 that includes retainer elements 100-2 extending upwardly therefrom. The retainer elements 100-2 are inserted into the detent portions 144 depicted in FIG. 3B. A boss portion 100-7 is disposed between the retainer elements 100-2 and may be configured to snap into the center notch 142 of the opening 140. A channel may be formed by, and between, the retainer elements 100-2 and the boss 100-7. In some embodiments, retainers 100-2 may be included along the lower portion of the body member 100-1. In this case, the modular connector 100 can be used to modularize a single gang opening to accommodate a plurality of electrical wiring devices within a single gang opening.

The boss 100-7 includes an upper threaded screw hole 100-5 that accommodates a wall plate mounting screw and a lower threaded screw hole 100-6 that accommodates a device (50, 60) mounting screw. Gussets (i.e., strengthening ribs) 100-8 are attached between the rear side of body 100-1 and boss 100-7 to provide lateral support for the centrally disposed boss 100-7.

The connector 100 includes an engagement device 102 formed at either end thereof. The engagement device 102 includes a wing structure 100-3 disposed along the front surface of the body member 100-1 and a center finger element 100-4 opposing the wing structure 100-3 (See FIG. 4B) to form a channel 100-9 that accommodates the planar mounting surfaces 14 disposed on either side of the opening 140. As explained in greater detail below, the channel 100-9 allows the modular connector 100 to slide up and down within the opening 140.

Figure 4C:
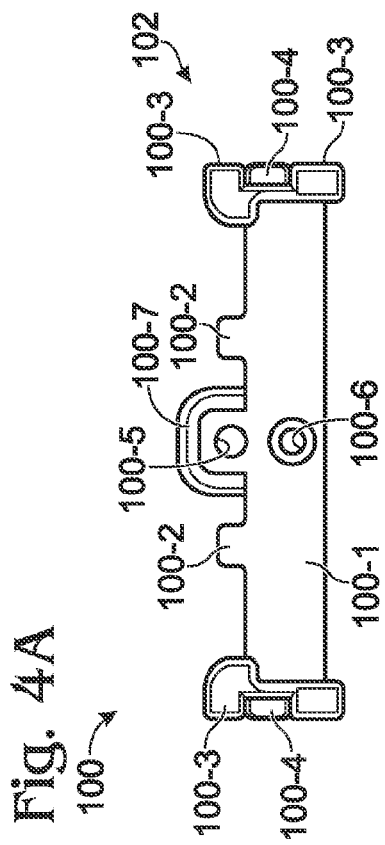
Figure 4D:
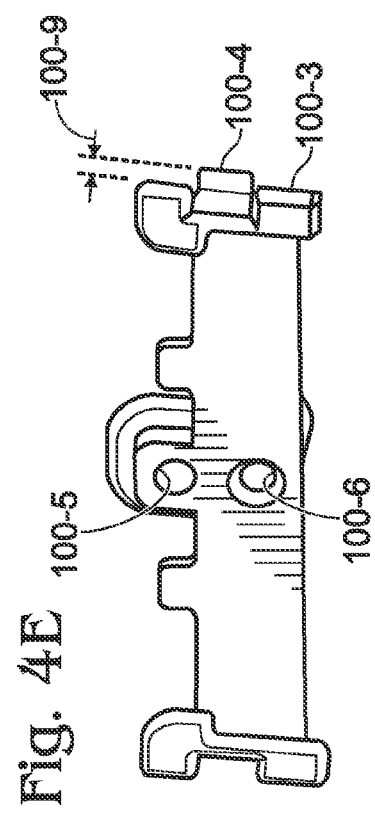
Figure 4E:
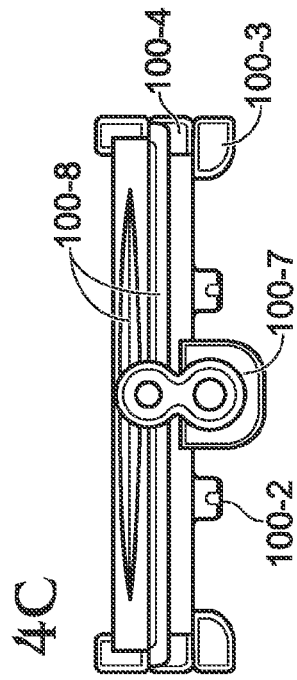

FIG. 4C is a rear view of the modular connector 100 that shows in greater detail the four gusset members 100-8 configured to support the boss 107. FIGS. 4D and 4E are isometric views that show the rear side and front side, respectively, of the modular connector 100.

Figure 5A:
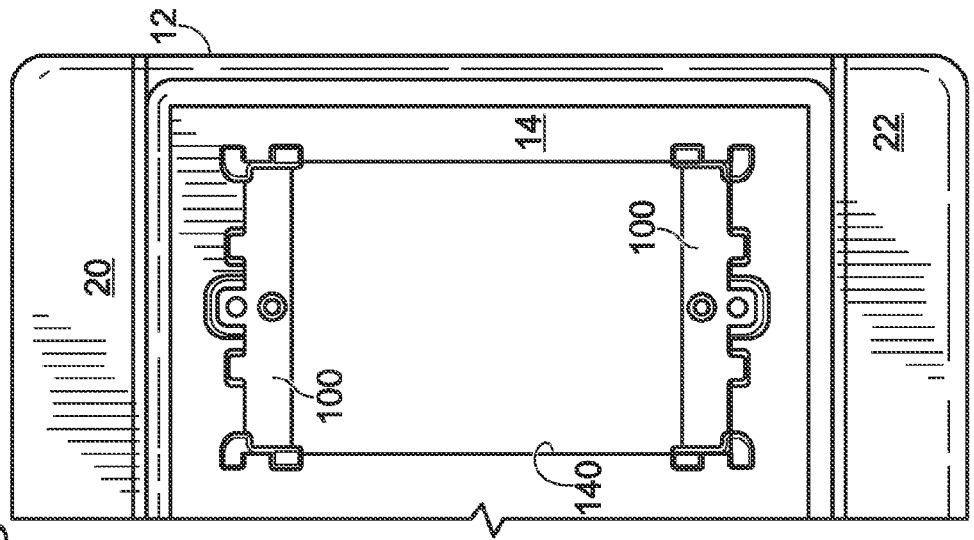
FIGS. 5A-5C are plan views illustrating the progressive installation of the modular connector depicted in FIGS. 4A-4E into the modular housing assembly depicted in FIGS. 3A-3B.
Figure 5B:
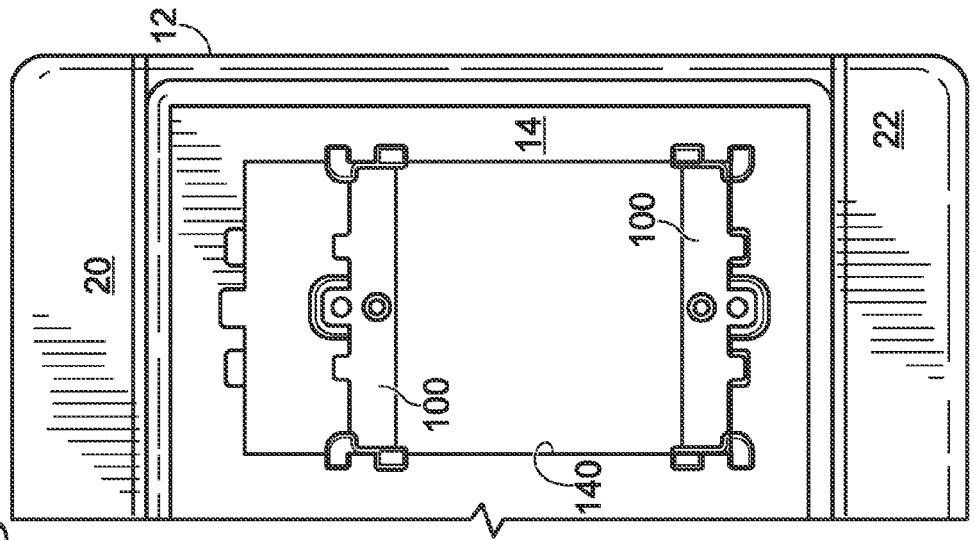
Figure 5C:
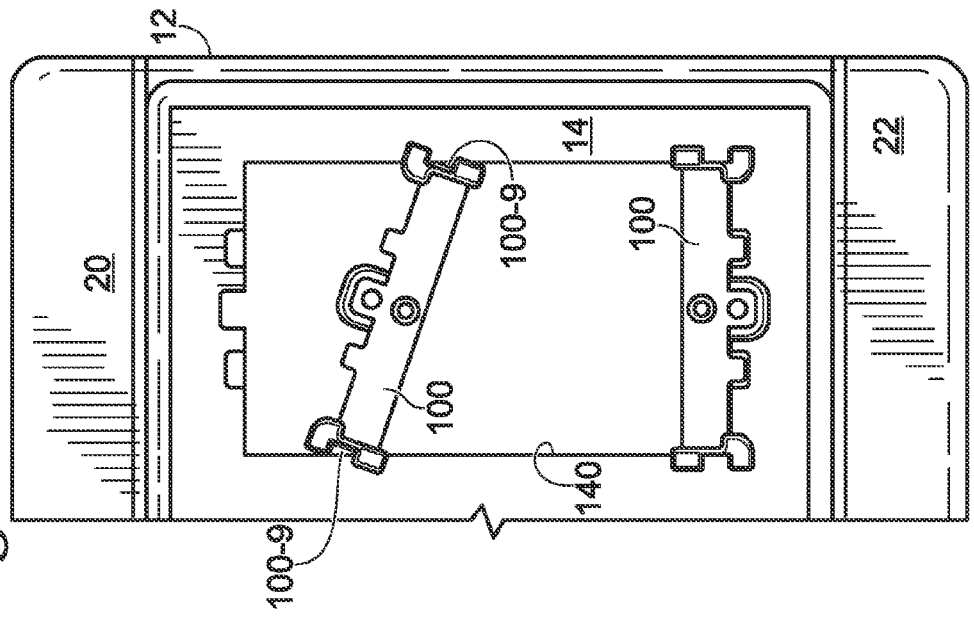

As embodied herein and depicted in FIGS. 5A-5C, various views illustrating the progressive installation of the modular connector 100 into the modular housing assembly are disclosed. In FIG. 5A, the modular connector 100 is inserted at an angle such that edges of the opposing sides of planar surface 14 fit within the respective channels 100-9. The modular connector 100 is leveled (See FIG. 5B) and slid into place (See FIG. 5C). Clearly, additional modular connectors 100 may also be employed to modularize the opening 140 in the manner previously described.

Figure 6:
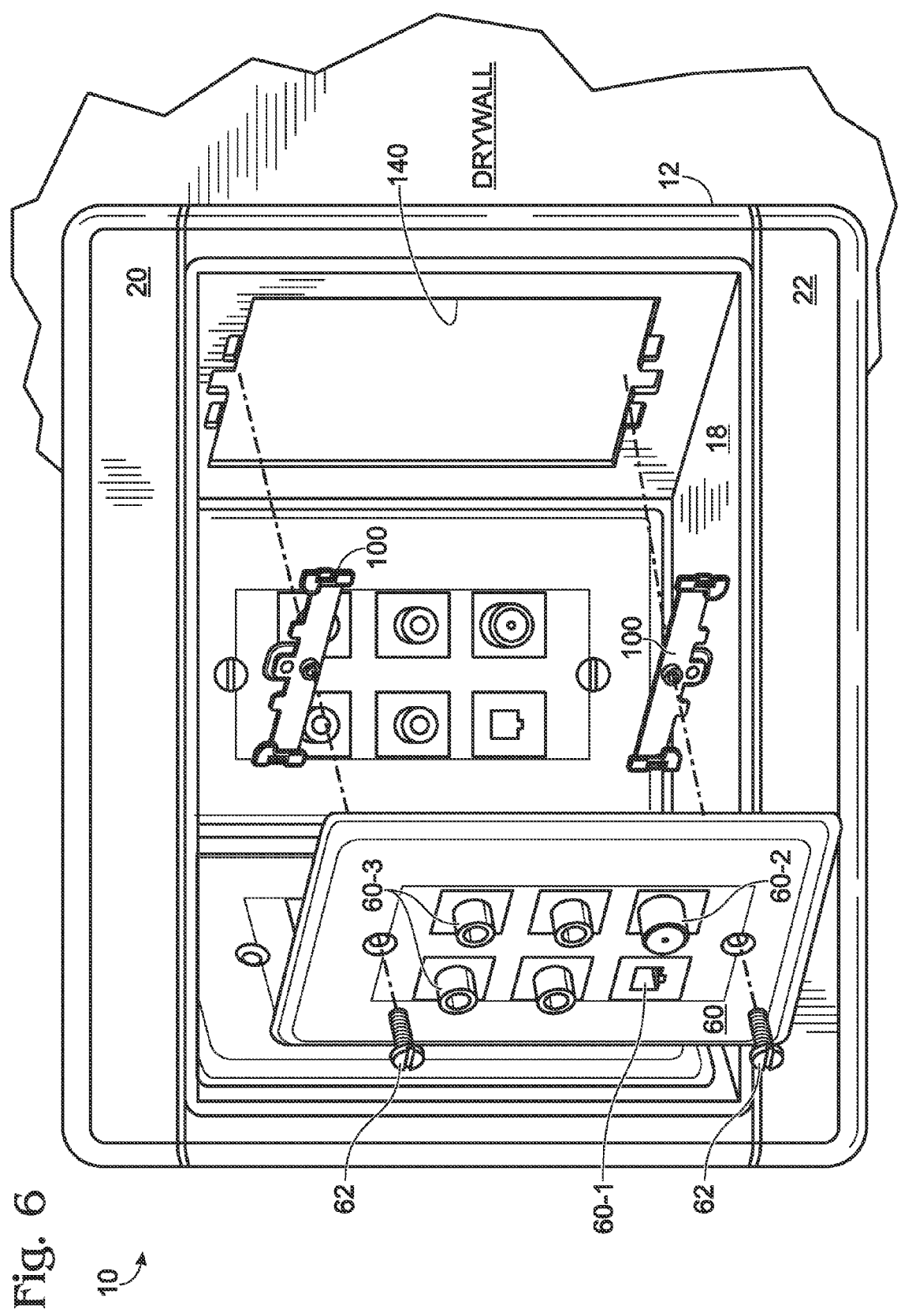
FIG. 6 is an exploded view showing the installation of a telecom device into the modular housing assembly depicted in FIGS. 3A-3B.

In reference to FIG. 6, an exploded view showing the installation of a telecom device 60 into the modular housing assembly 10 is disclosed. In this view, the frame 12 is mounted within an opening in the drywall using the screw brackets shown in FIG. 3B. Then, the modular connectors 100 are inserted into the opening 140 formed in planar surface 14-1. The telecom device 60 is mounted to the modular connector 100 with the mounting screws 62, which are inserted at either end thereof. The telecom device 60 is shown in this example to include a telephony jack 60-1, a coaxial connector 60-2 and various S-ports 60-3.

In reference to FIG. 7, an exploded view showing the installation of a device box 5 and a single-gang sized electrical wiring device (e.g., AC electrical duplex outlet) into the modular housing assembly 10 is disclosed. This embodiment shows the versatility of the present invention because the device box 5 is shown as an old work device box that also includes screw brackets 5-1. Thus, the modular connector 100 can be omitted from the installation and the device box 5 is inserted directly into the opening 140 formed in planar surface 14-3. Alternatively, the modular connector 100 may be employed in conjunction with a device box 5 configured to be connected to connector 100. In either event, once the device box is inserted into opening 140 and mounted to assembly 10, the electrical wiring device 50 is inserted into the device box and mounted thereto via the mounting ears 50-1. Then, the wall plate 52 is disposed over the electrical wiring device 50 and attached via screws 52-1 and 52-2 to complete the installation.

Figure 8A:
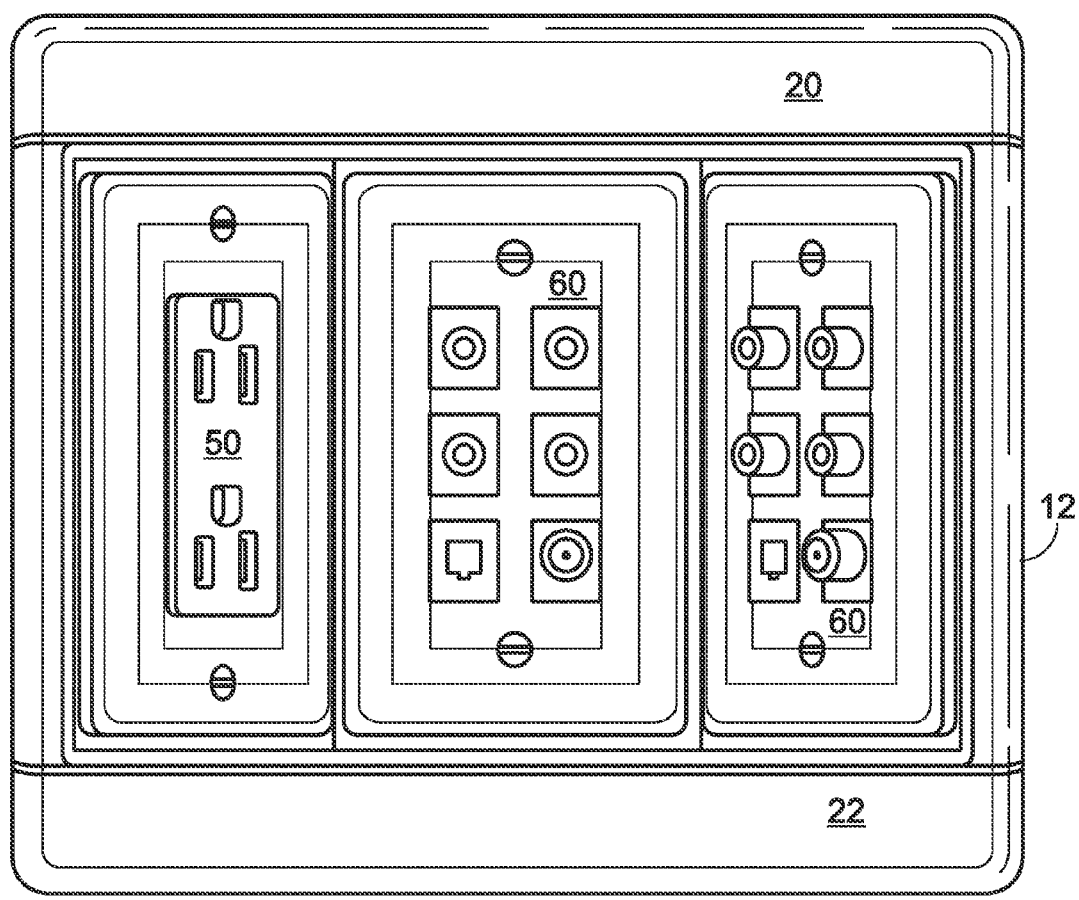
FIGS. 8A-8B illustrate the modular housing assembly depicted in FIGS. 3A-3B, the fully assembled modular housing assembly including both an AC electrical wiring device and two low voltage telecom devices in accordance with the present invention.
Figure 8B:
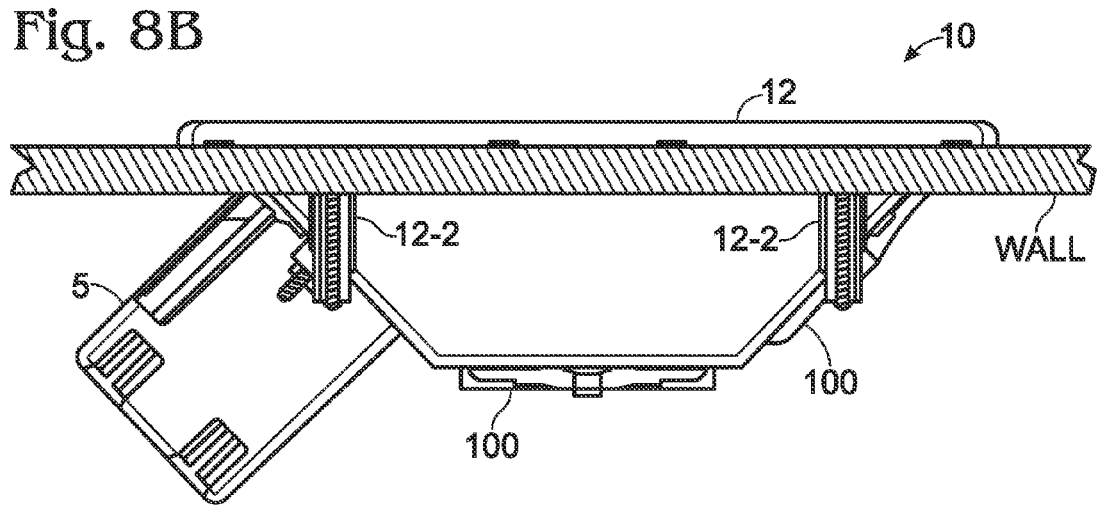

In reference to FIGS. 8A-8B, a fully assembled modular housing assembly 10, including one AC electrical wiring device 50 and two telecom devices 60, is disclosed in accordance with the present invention. FIG. 7A shows a front elevation view, and FIG. 8B shows a sectional view through the drywall. In the sectional view, the wall board is shown as being disposed between the screw brackets 12-2 and frame 12. As shown in this view, screw brackets 12-2 have not yet been tightened down. Note that because planar surface 14-3 is angled inwardly, the device box 5 also extends within the wall cavity at an angle and fits easily there within. The same is true for planar surface 14-1. Planar surface 14-2 is recessed and parallel to the drywall surface. If the wall cavity is relatively shallow, the consumer may opt to use planar surface 14-2 for the telecom devices. If the wall cavity is more spacious, this issue is not of concern. In any event, the present invention advantageously gives the consumer multiple mounting options.

Figure 9A:
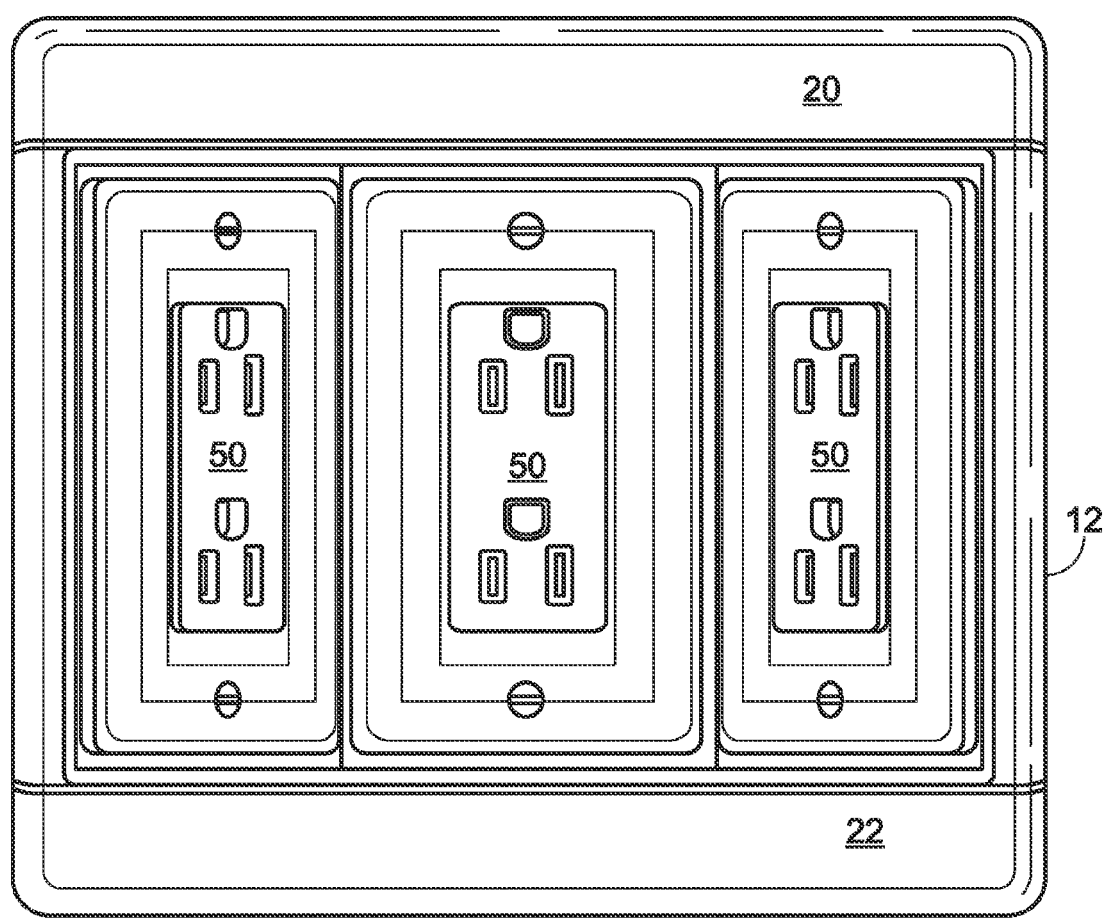
FIGS. 9A-9B illustrate the modular housing assembly depicted in FIGS. 3A-3B, the fully assembled modular housing assembly including only AC electrical wiring devices in accordance with the present invention.
Figure 9B:
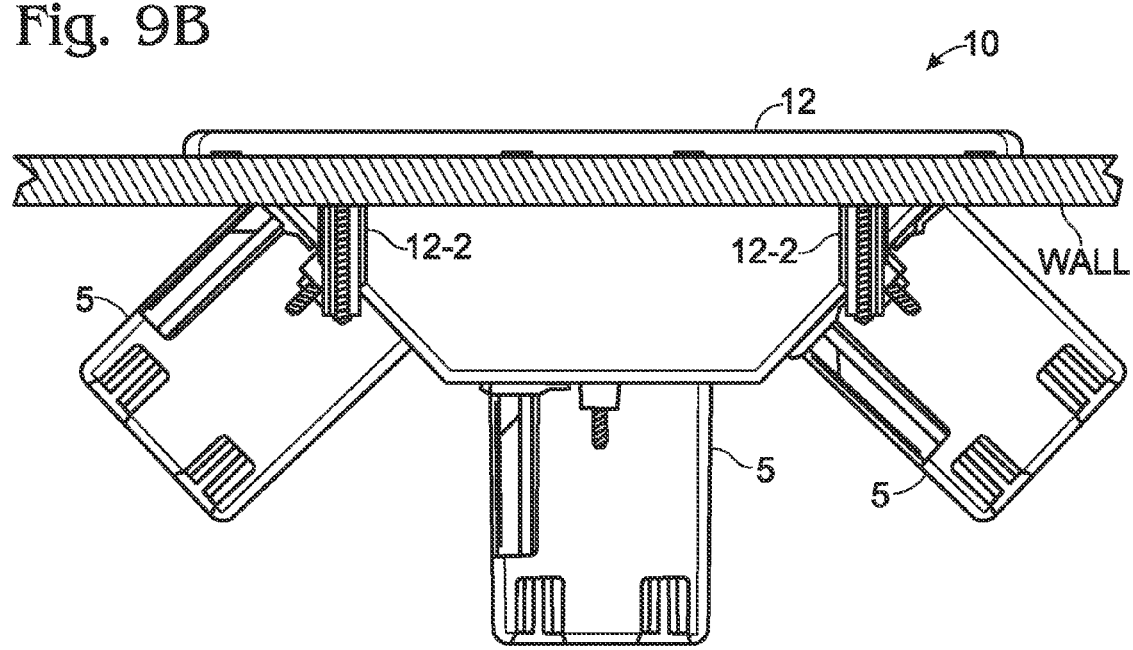

In reference to FIGS. 9A-9B, a fully assembled modular housing assembly 10 including three electrical wiring devices 50 is disclosed in accordance with the present invention. FIG. 9A shows a front elevation view, whereas FIG. 9B shows a sectional view through the drywall. In the sectional view, the wall board is shown as being disposed between the screw brackets 12-2 and frame 12.

Figure 10A:
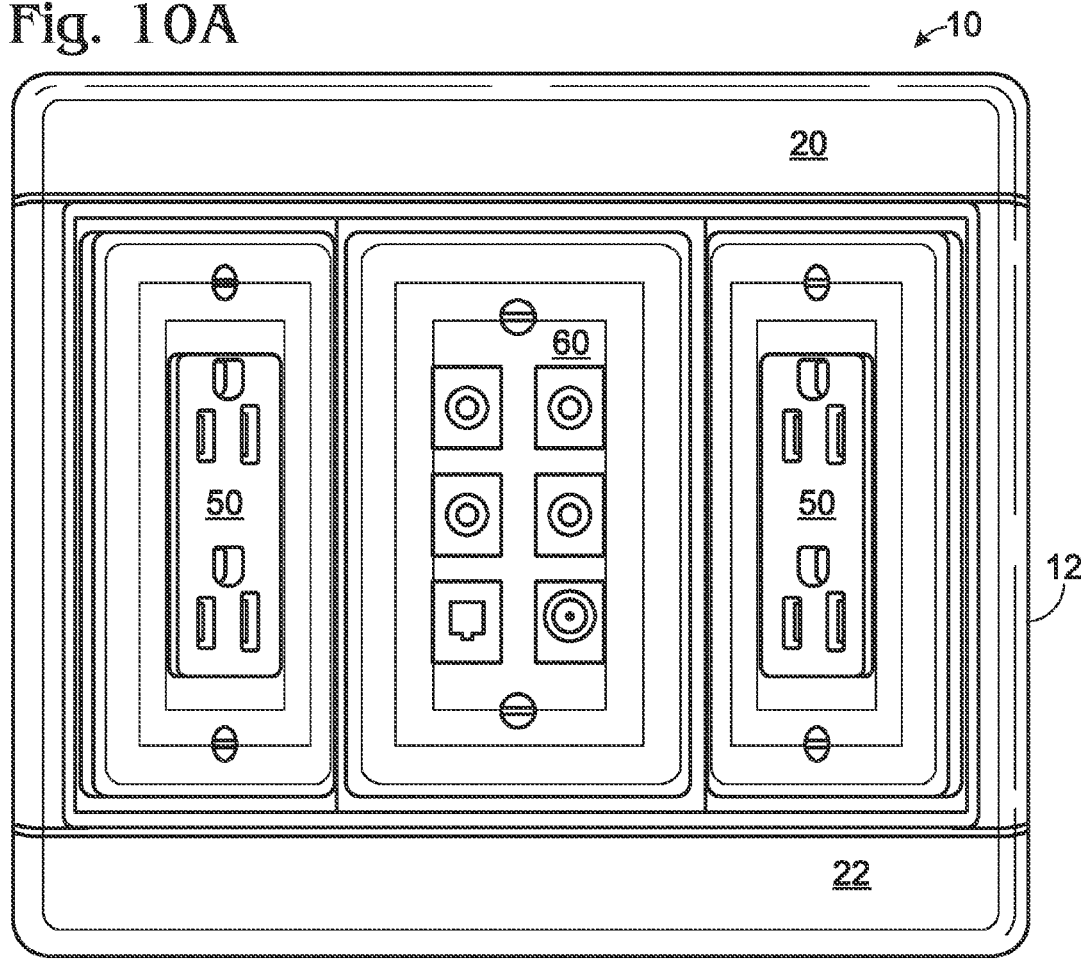
FIGS. 10A-10B illustrate the modular housing assembly depicted in FIGS. 3A-3B, the fully assembled modular housing assembly including two AC electrical wiring devices and one low voltage telecom devices in accordance with the present invention.
Figure 10B:
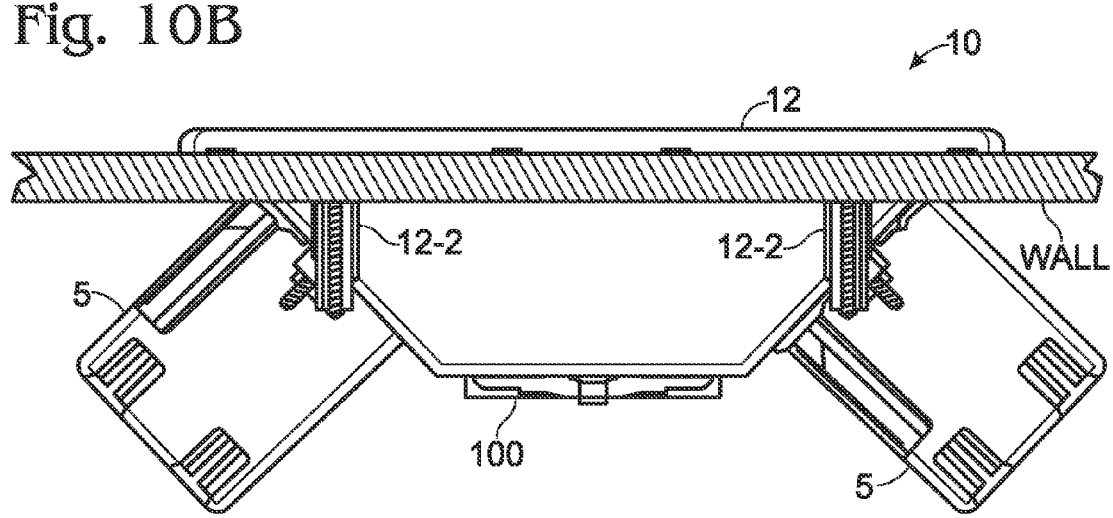

In reference to FIGS. 10A-10B, a fully assembled modular housing assembly 10 including two AC electrical wiring devices 50 and one low voltage telecom device 60 is disclosed in accordance with the present invention. FIG. 10A shows a front elevation view, whereas FIG. 10B shows a sectional view through the drywall. Again, in the sectional view, the wall board is shown as being disposed between the screw brackets 12-2 and frame 12.

Figure 11A:
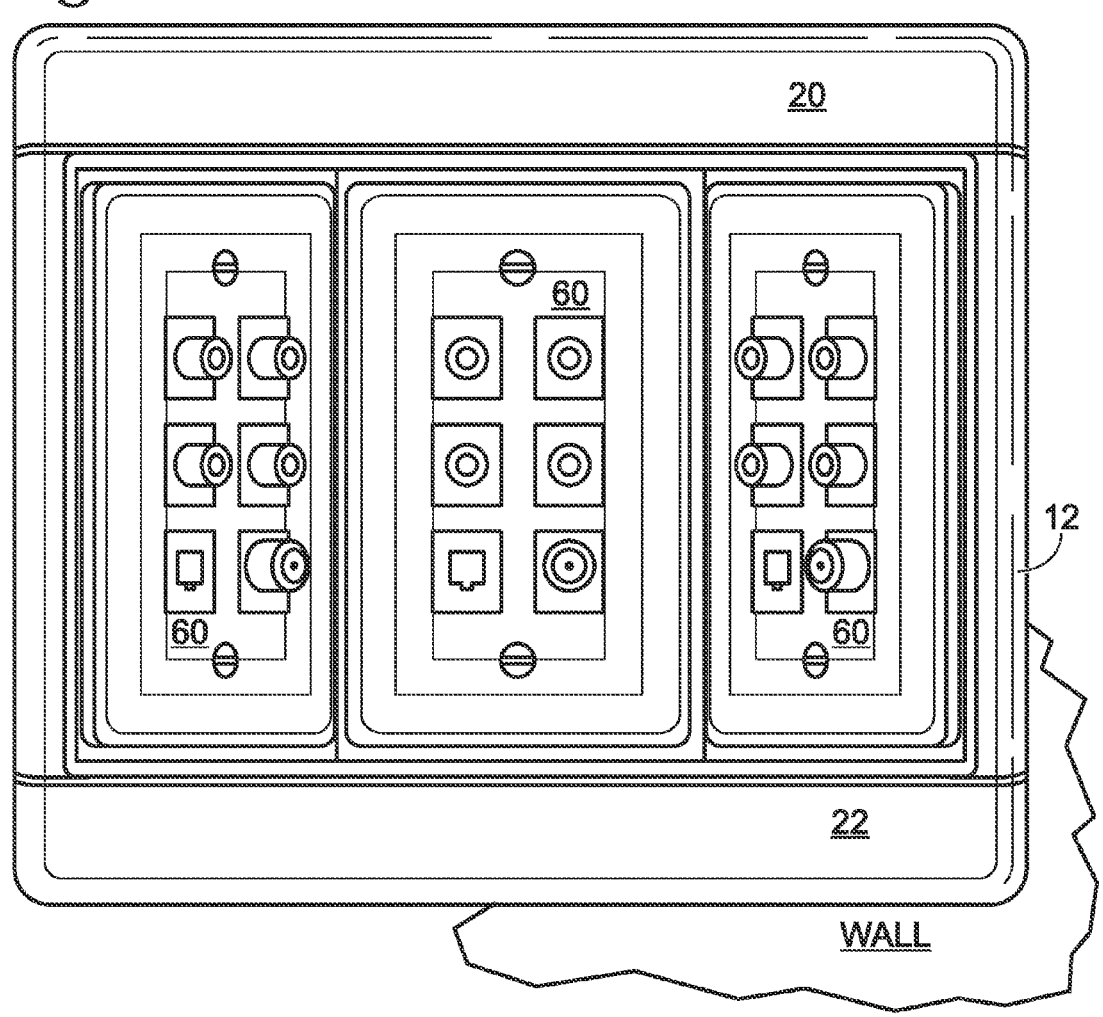
FIGS. 11A-11B illustrate the modular housing assembly depicted in FIGS. 3A-3B, the fully assembled modular housing assembly including only low voltage telecom devices in accordance with the present invention.
Figure 11B:
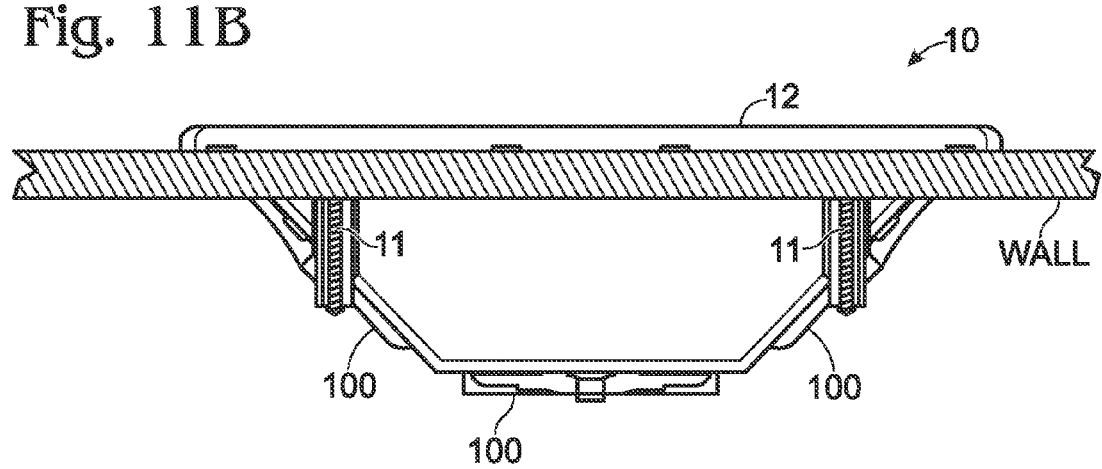

Finally, FIGS. 11A-11B show a fully assembled modular housing assembly that includes three telecom devices 60 in accordance with the present invention. FIG. 11A shows a front elevation view, whereas FIG. 11B shows a sectional view through the drywall. Once again, the wall board is shown as being disposed between the screw brackets 12-2 and frame 12 in the sectional view.

Figure 12A:
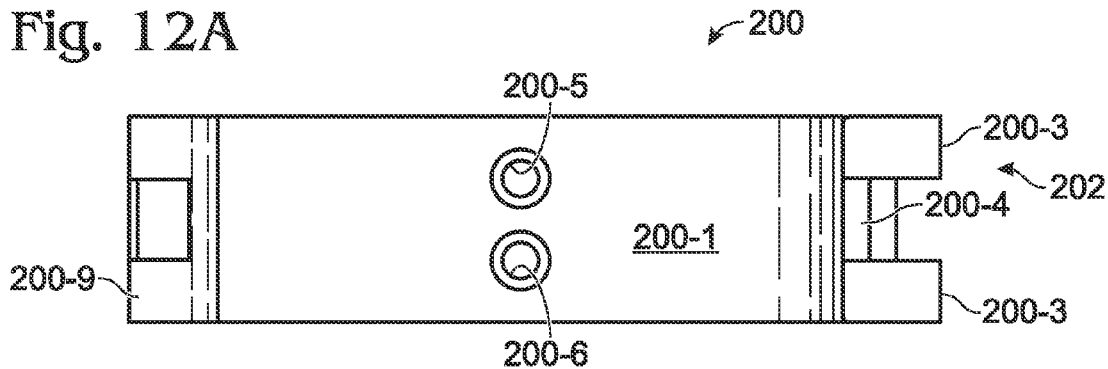
FIGS. 12A-12D are directed to various views of a modular connector in accordance with another embodiment of the present invention.
Figure 12B:
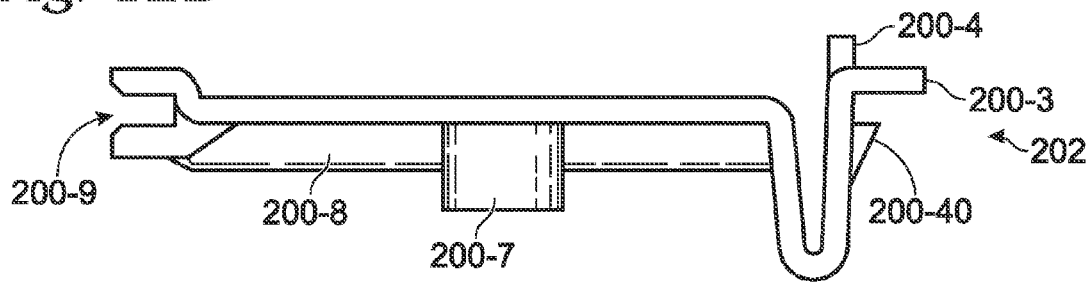
Figure 12C:
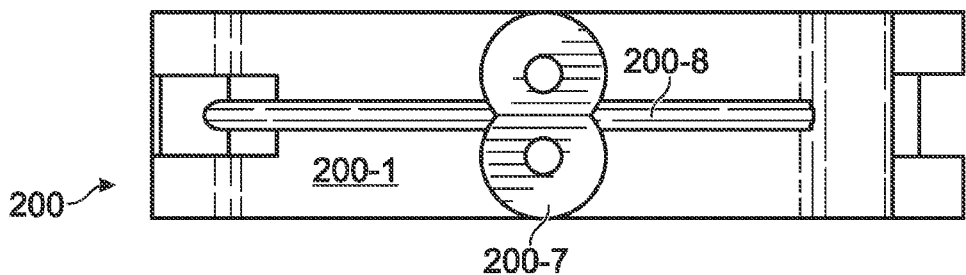
Figure 12D:
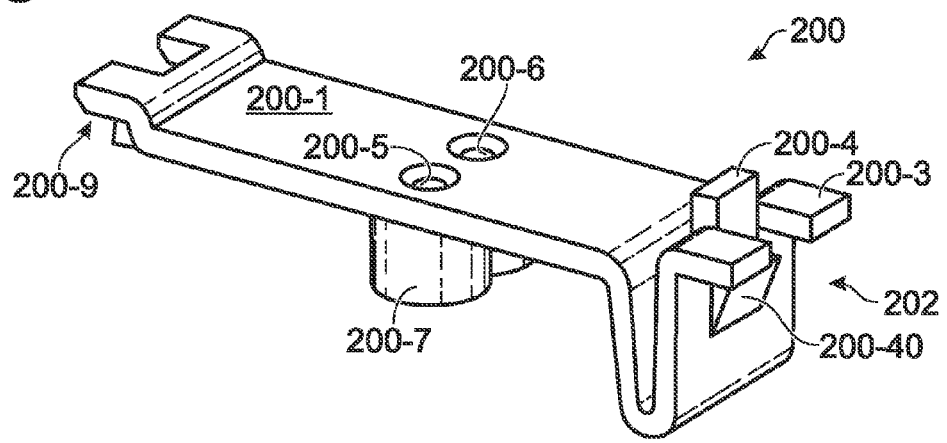

As embodied herein and depicted in FIGS. 12A-12D, various views of a modular connector 200 in accordance with another embodiment of the present invention are disclosed. Many of the features of modular connector 200 are analogous to those of connector 100 depicted in FIG. 3. In FIG. 12A, a front elevation view is provided such that the threaded screw holes 200-5 and 200-6 are visible. The left side of the connector 200 includes a channel 200-9 that is configured to accommodate the edge of the planar surface 14 that forms opening 140. At the right side of the connector 200, a spring clip 202 is formed by portions 200-3 and 200-4. FIG. 12B is a side view of the modular connector 200 and more clearly shows the "C-shaped" channel 200-9 at the right end thereof. Connector 200 includes a boss 200-7 for the threaded screw holes 200-5 and 200-6. The boss 200-7 is again supported by gussets 200-8. FIG. 12C is a rear view that shows the gussets 200-8 in greater detail. Comparing FIG. 12B and FIG. 12D, the center portion 220-4 of the spring clip 202 and the end portions 200-3 are configured to separate when an edge of the planar surface 14 is inserted therebetween. Note also that a lower ledge 200-40 of the center portion 200-4 functions as a stop that abuts the edge of the planar surface 14 that forms opening 140.

Figure 13A:
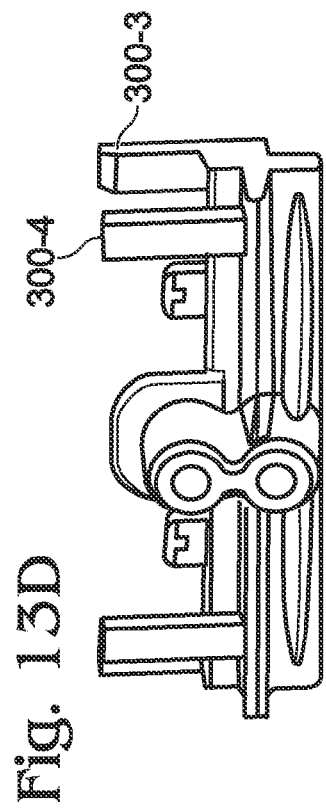
FIGS. 13A-13E are directed to various views of a modular connector in accordance with another embodiment of the present invention.
Figure 13B:
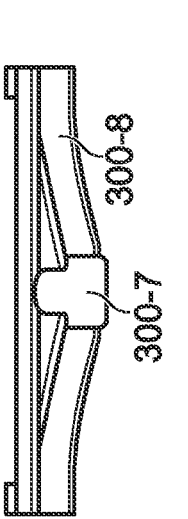
Figure 13C:
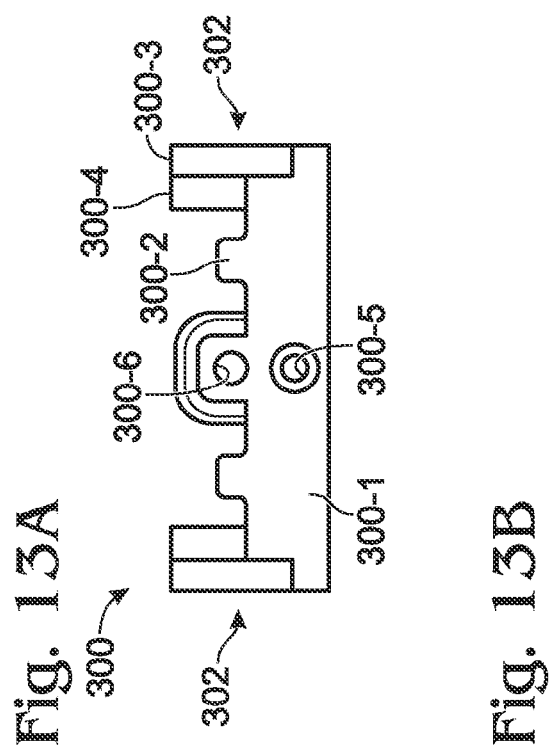
Figure 13D:
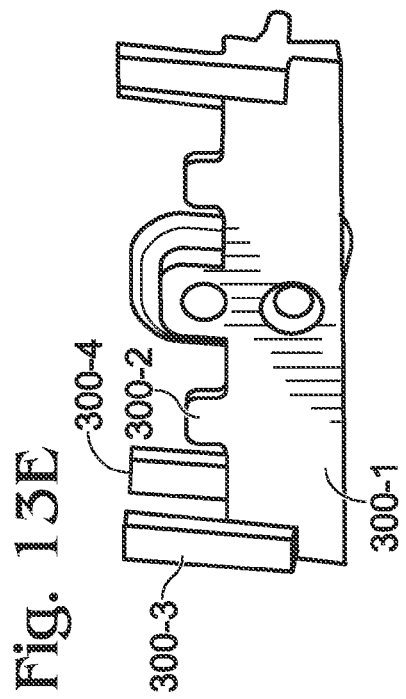
Figure 13E:
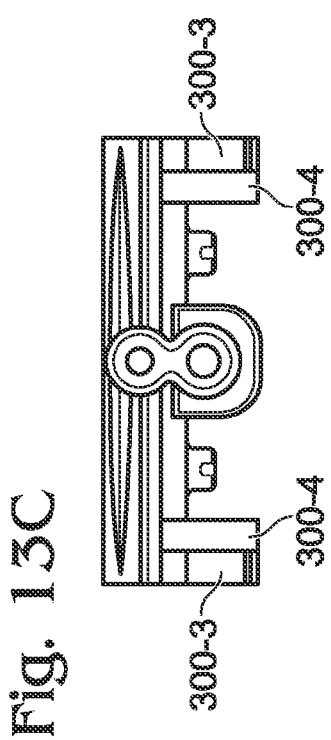

As embodied herein and depicted in FIGS. 13A-13E, various views of a modular connector 300 in accordance with additional embodiments of the present invention are disclosed. These embodiments are quite similar to the embodiment of FIG. 4. The difference between the two embodiments is the gripping clip 302 which includes an outboard grip member 300-3 and an inboard grip member 300-4. Like the previous embodiments, the gripping clip 302 captures an edge of the planar surface 14 forming opening 140 there within. In the embodiment of FIGS. 13A and 13C, the gripping clip 302 is formed at either end of the longitudinal body member 300-1. In the embodiment of FIGS. 13D and 13E, the gripping clip 302 is only formed at one end of the longitudinal body 300-1.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A modular wall box system comprising:
   a housing structure that includes,
      a rectangular frame portion configured to be mounted substantially flush with respect to a wall upon installation of the system, the rectangular frame portion having a perimeter portion that forms a frame opening,
      a recessed roof portion and a recessed floor portion connected to the rectangular frame portion such that the recessed roof portion is substantially parallel to the recessed floor portion,
      a plurality of wall surfaces connected between the roof portion and the floor portion to form a recessed device mounting volume accessible via the frame opening, each wall surface of the plurality of wall surfaces including a single gang modular device opening configured to accommodate either an AC electrical wiring device or a low voltage telecom device, a first wall surface of the plurality of wall surfaces being connected to the recessed roof portion and the recessed floor portion at a first acute angle, and a second wall surface of the plurality of wall surfaces being connected to the recessed roof portion and the recessed floor portion at a second acute angle such that each of the plurality of wall surfaces are not coplanar with respect to any other one of the plurality of wall surfaces;
   at least a portion of the perimeter being configured as at least one mounting flange, the at least one mounting flange including a plurality of mounting elements configured to mount the housing structure to the wall; and
   at least one removable flange cover substantially conforming to a shape of the at least one mounting flange such that it does not occlude the frame opening or prevent access to the recessed device mounting volume, the at least one removable flange cover being configured to be removably coupled to the at least one mounting flange after the housing structure is mounted to the wall such that the at least one removable flange cover is substantially flush with respect to adjacent portions of the rectangular frame portion, the at least one removable flange cover being configured to cover the plurality of mounting elements when the at least one removable flange cover is coupled to the at least one mounting flange.

2. The system of claim 1, further comprising at least one modular connector configured to be inserted within the single gang modular device opening, the at least one modular connector including a slidable engagement portion disposed at either end thereof, the slidable engagement portion being configured to slidably engage a lateral edge of the wall surface forming the single gang modular device opening such that the at least one modular connector is moveable to any vertical position within the single gang modular device opening.

3. The system of claim 2, wherein the at least one modular connector includes a first modular connector disposed at one end of the single gang modular device opening and a second modular connector disposed at a second opposing end of the single gang modular device opening, the first modular connector and the second modular connector being configured to mount either a low voltage telecom device or a device box for an AC electrical wiring device therebetween.

4. The system of claim 2, wherein the at least one modular connector includes at least one retainer element configured to mate with a corresponding indent formed an upper edge or lower edge forming the single gang modular device opening.

5. The system of claim 2, wherein the at least one modular connector includes at least one boss element for a threaded screw opening, the at least one boss element being configured to snap into an upper edge or lower edge of the single gang modular device opening.

6. The system of claim 2, wherein the slidable engagement portion includes a channel formed between a finger portion and a wing portion.

7. The system of claim 2, wherein the slidable engagement portion includes a flexible spring clip.

8. The system of claim 2, wherein the slidable engagement portion includes a channel formed between an outboard gripper member and an in-board portion.

9. The system of claim 1, wherein the at least one mounting flange includes a plurality of marking holes disposed therein.

10. The system of claim 1, wherein the at least one mounting flange includes a plurality of registration elements configured to align the at least one removable flange cover with the at least one mounting flange.

11. The system of claim 1, wherein the at least one mounting flange includes a first mounting flange and a second mounting flange opposing the first mounting flange.

12. The system of claim 11, wherein the first mounting flange is disposed on an upper frame member portion of the rectangular frame portion and the second mounting flange is disposed on a lower frame member portion of the rectangular frame portion.

13. The system of claim 11, wherein the first mounting flange is disposed on a first upright frame member portion of the rectangular frame portion and the second mounting flange is disposed on a second upright frame member portion of the rectangular frame portion.

14. The system of claim 1, wherein the plurality of wall surfaces includes a third wall surface configured to include a third single gang modular device opening, the third wall surface being interposed between the first wall surface and the second wall surface, and wherein the first wall surface is configured to include a first single gang modular device opening and wherein the second wall surface is configured to include a second single gang modular device opening.

15. The system of claim 14, wherein the third wall surface is substantially parallel to the frame opening.

16. The system of claim 14, wherein the first, second and third single gang modular device openings can accommodate AC electrical devices, low voltage telecom devices, or any combination thereof.

17. The system of claim 14, wherein a first centerline normal to the first single gang modular device opening and a third centerline normal to the third single gang modular device opening form the first acute angle.

18. The system of claim 14, wherein a second centerline normal to the second single gang modular device opening and a third centerline normal to the third single gang modular device opening form the second acute angle.

19. A modular wall box system comprising:
a housing structure that includes,
a rectangular frame portion configured to be mounted substantially flush with respect to a wall upon installation of the system, the rectangular frame portion including an upper frame member, a lower frame member, a first upright frame member interconnecting the upper frame member to the lower frame member at one end thereof and a second upright frame member interconnecting the upper frame member to the lower frame member at second end thereof,
a recessed roof portion connected to the upper frame member and a recessed floor portion connected to the lower frame member such that the recessed roof portion is substantially parallel to the recessed floor portion,
a plurality of wall surfaces connected between the roof portion and the floor portion to form a recessed device mounting volume, each wall surface of the plurality of wall surfaces including a single gang modular device opening configured to accommodate either an AC electrical wiring device or a low voltage telecom device, a first wall surface of the plurality of wall surfaces being connected to the first upright frame member and extending away from the upper frame member and the lower frame member at a first acute angle, and a second wall surface of the plurality of wall surfaces being connected to the second upright frame member and also extending away from the upper frame member and the lower frame member at a second acute angle such that each of the plurality of wall surfaces are not coplanar with respect to any other one of the plurality of wall surfaces;
at least one mounting flange formed in at least one of the upper frame member, lower frame member, first upright frame member or second upright frame member, the at least one mounting flange including a plurality of mounting elements configured to mount the housing structure to the wall;
at least one removable flange cover configured to be removably coupled to the at least one mounting flange after the housing structure is mounted to the wall, the at least one removable flange cover being configured to cover the plurality of mounting elements when the at least one removable flange cover is coupled to the at least one mounting flange; and
at least one modular connector configured to be inserted within the single gang modular device opening, the at least one modular connector including a slidable engagement portion disposed at either end thereof, the slidable engagement portion being configured to slidably engage a lateral edge of the wall surface forming the single gang modular device opening such that the at least one modular connector is slidably moveable to any vertical position within the single gang modular device opening.

20. The system of claim 19, wherein the at least one modular connector includes a first modular connector disposed at one end of the single gang modular device opening and a second modular connector disposed at a second opposing end of the single gang modular device opening, the first modular connector and the second modular connector being configured to mount either a low voltage telecom device or a device box for an AC electrical wiring device therebetween.

21. The system of claim 19, wherein the at least one modular connector includes at least one retainer element configured to mate with a corresponding indent formed an upper edge or lower edge forming the single gang modular device opening.

22. The system of claim 19, wherein the at least one modular connector includes at least one boss element for a threaded screw opening, the at least one boss element being configured to snap into an upper edge or lower edge of the single gang modular device opening.

23. The system of claim 19, wherein the slidable engagement portion includes a channel formed between a finger portion and a wing portion.

24. The system of claim 19, wherein the slidable engagement portion includes a flexible spring clip.

25. The system of claim 19, wherein the slidable engagement portion includes a channel formed between an outboard gripper member and an in-board portion.

26. The system of claim 19, wherein the at least one mounting flange is an integrally formed portion of the housing structure.

27. The system of claim 19, wherein the at least one mounting flange includes a plurality of marking holes disposed therein.

28. The system of claim 19, wherein the at least one mounting flange includes a plurality of registration elements configured to align the at least one removable flange cover with the at least one mounting flange.

29. The system of claim 19, wherein the at least one mounting flange includes a first mounting flange and a second mounting flange opposing the first mounting flange.

30. The system of claim 29, wherein the first mounting flange is disposed on the upper frame member and the second mounting flange is disposed on the lower frame member.

31. The system of claim 29, wherein the first mounting flange is disposed on the first upright frame member and the second mounting flange is disposed on the second upright frame member.

32. The system of claim 19, wherein the plurality of wall surfaces include the first wall surface including a first single gang modular device opening, the second wall surface including a second single gang modular device opening, and a third wall surface including a third single gang modular device opening, the third wall surface being interposed between the first wall surface and the second wall surface.

33. The system of claim 32, wherein the third wall surface is substantially parallel to the rectangular frame portion.

34. The system of claim 32, wherein the first, second and third single gang modular device openings can accommodate AC electrical devices, low voltage telecom devices, or any combination thereof.

35. The system of claim 32, wherein a first centerline normal to the first single gang modular device opening and a third centerline normal to the third single gang modular device opening form the first acute angle.

36. The system of claim 32, wherein a second centerline normal to the second single gang modular device opening and a third centerline normal to the third single gang modular device opening form the second acute angle.

37. A modular wall box system comprising:
  a housing structure that includes,
  a rectangular flame portion configured to be mounted substantially flush with respect to a wall upon installation of the system,
  a recessed roof portion and a recessed floor portion connected to the rectangular frame portion member such that the recessed roof portion is substantially parallel to the recessed floor portion,
  a plurality of wall surfaces connected between the roof portion and the floor portion to form a recessed device mounting volume, each wall surface of the plurality of wall surfaces including a single gang modular device opening configured to accommodate either an AC electrical wiring device or a low voltage telecom device, and
  at least one modular connector configured to be inserted within the single gang modular device opening of at least one of the plurality of wall surfaces, the at least one modular connector including a slidable engagement portion disposed at either end thereof, the slidable engagement portion being configured to slidably engage a lateral edge of the wall surface forming the single gang modular device opening such that the at least one modular connector is moveable to any vertical position within the single gang modular device opening.

38. The system of claim 37, wherein the at least one modular connector includes a first modular connector disposed at one end of the single gang modular device opening and a second modular connector disposed at a second opposing end of the single gang modular device opening, the first modular connector and the second modular connector being configured to mount either a low voltage telecom device or a device box for an AC electrical wiring device therebetween.

\* \* \* \* \*